United States Patent [19]
Goto

[11] Patent Number: 5,972,816
[45] Date of Patent: Oct. 26, 1999

[54] GLASS-CERAMIC SUBSTRATE FOR A MAGNETIC INFORMATION STORAGE MEDIUM

[75] Inventor: Naoyuki Goto, Sagamihara, Japan

[73] Assignee: Kabushiki Kaisha Ohara, Kanagawa-ken, Japan

[21] Appl. No.: 08/964,537

[22] Filed: Nov. 5, 1997

[30] Foreign Application Priority Data

Nov. 14, 1996 [JP] Japan ................................. 8-318838

[51] Int. Cl.$^6$ ........................... C03C 10/14; C03C 10/12
[52] U.S. Cl. ................................. 501/4; 501/7; 501/63; 428/694 ST; 428/694 SG
[58] Field of Search ............ 501/4, 7, 63; 428/694 ST, 428/694 SG

[56] References Cited

U.S. PATENT DOCUMENTS

| | | | |
|---|---|---|---|
| 4,814,297 | 3/1989 | Beall et al. ................. | 501/7 |
| 4,971,932 | 11/1990 | Alpha et al. ................ | 501/3 |
| 4,985,306 | 1/1991 | Morizane et al. . | |
| 5,336,643 | 8/1994 | Goto et al. .................. | 501/7 |
| 5,391,522 | 2/1995 | Goto et al. .................. | 501/4 |
| 5,550,696 | 8/1996 | Nguyen . | |
| 5,567,217 | 10/1996 | Goto et al. .................. | 501/7 |
| 5,580,363 | 12/1996 | Goto et al. .................. | 501/4 |
| 5,591,682 | 1/1997 | Goto ........................... | 501/4 |
| 5,626,935 | 5/1997 | Goto et al. ........... | 428/694 ST |
| 5,691,256 | 11/1997 | Taguchi et al. .............. | 501/7 |
| 5,744,208 | 4/1998 | Beall et al. .................. | 501/4 |
| 5,804,520 | 9/1998 | Morinaga et al. ............ | 501/4 |

FOREIGN PATENT DOCUMENTS

| | | |
|---|---|---|
| 0285243 | 10/1988 | European Pat. Off. . |
| 0384574 | 8/1990 | European Pat. Off. . |

*Primary Examiner*—Karl Group
*Attorney, Agent, or Firm*—Hedman, Gibson, & Costigan, P.C.

[57] ABSTRACT

A glass-ceramic substrate for a magnetic information storage medium such as a magnetic disk having a super flatness suited for a contact recording system includes a $SiO_2$—$Al_2O_3$—$Li_2O$ system glass-ceramic and has either β-quartz solid solution (β-$SiO_2$ solid solution) or a mixture of β-quartz solid solution (β-$SiO_2$ solid solution) and β-spodumene solid solution (β-$Li_2O.Al_2O_3.4SiO_2$ solid solution) as its main crystal phase. The surface roughness (Ra) of the glass-ceramic substrate after polishing is within a range from 1 Å to 5 Å.

12 Claims, 8 Drawing Sheets

15KV ×10,000  1μm  WD10

15KV ×10,000  1μm  WD10

15KV ×10,000 10μm WD10

15KV ×10,000 10μm WD10

15KV ×10,000  10μm  WD10

SURFACE ROUGHNESS Ra = 2Å

GLASS-CERAMIC SUBSTRATE FOR A MAGNETIC INFORMATION STORAGE MEDIUM

BACKGROUND OF THE INVENTION

This invention relates to a substrate for a magnetic information storage medium used for an information storage device and, more particularly, to a substrate for magnetic information storage medium such as a magnetic disk made of a glass-ceramic having an improved surface characterisitic including a super flatness suited for a contact recording system and being capable of preventing sticking of a magnetic head to a magnetic information storage medium in a CSS (contact start and stop) type magnetic information storage medium, and a magnetic information storage medium formed by subjecting the magnetic information storage medium substrate to a thin film-forming process.

There is an increasing tendency for utilizing a personal computer for multiple media purpose and a digital video camera with resulting handling of moving image and voice information and this tendency necessitates an information storage medium of a larger recording capacity. For this purpose, the bit number and track density of a magnetic information storage medium must be increased and the size of a bit cell must be reduced for increasing a longitudinal recording density. As for a magnetic head, it must be operated in closer proximity to the surface of the magnetic information storage medium in conformity with the reduction of the bit cell size. In a case where a magnetic head is operated at an extremely low flying height or in a semi-contact state against a magentic information storage medium, there occur sticking of a magnetic head to the surface of a magnetic information storage medium and accompanying head crash and damage to a thin magnetic film at the time of start and stop of the magnetic head.

For overcoming such problem, there is an increasing necessity for development of new techniques for start and stop of a magnetic head including the ramp loading system according to which a magnetic head is completely brought outside of the surface of a magnetic information storage medium at the time of start and stop of the magnetic head and the landing zone system according to which a processing for preventing sticking of a magnetic head is made in a particular portion (i.e., a portion about the inner periphery where no recording or writing of data is made) of a magnetic information storage medium substrate and the magnetic head starts and stops in this particular portion. In the current CSS type information storage device, the magnetic head repeats an operation according to which the magnetic head is in contact with the magnetic disk before starting of operation of the device and is lifted from the magnetic disk when the operation of the device is started. If the surface of contact of the magnetic head with the magnetic disk is a mirror surface, sticking of the magnetic head to the magentic disk occurs with the result that rotation of the magnetic disk is not started smoothly due to increase in friction and damage to the disk surface occurs. Thus, the magnetic disk is required to satisfy two conflicting demands of realizing lowering of the magnetic head necessitated by the increase in the recording capacity on one hand and prevention of sticking of the magnetic head on the other. For satisfying these two conflicting demands, development is under way for the techniques of the ramp loading system according to which the magnetic head is completely brought outside of the magnetic information storage medium and the landing zone system according to which an area for start and stop of the magnetic head is provided in a particular zone of the magnetic informatoin storage medium. Further, not only the current fixed type information storage devices, but also a removable information storage device is being developed for use in, e.g., a digital video camera. From the standpoint of such new technique, characteristics required for a substrate of a magnetic information storage medium are as follows:

(1) In the ramp loading system for a magnetic information storage device, the magnetic head is operated, as a result of increase in the recording capacity, in a semicontact state or in a complete contact state with respect to the surface of a magnetic information storage medium and, for this reason, the magnetic informaton storage medium substrate must have a super flat surface with a surface roughness of 1 Å to 5 Å and the substrate must be capable of being polished to such super flat surface.

(2) In the landing zone system for a magnetic information storage device, the landing zone (i.e., a zone in which the magnetic head starts and stops) must have a surface state which can sufficiently prevent sticking of the magnetic head. For this purpose, projections and depressions must be formed on the surface of the magnetic information storage medium by means of a laser diode pumped solid-state laser or a $CO_2$ laser.

(3) In the CSS characteristics in the landing zone type magnetic information storage medium, sticking tends to occur between the head and the magnetic information storage medium due to increase in contact resistance caused by a high speed rotation of the magnetic head information storage medium, if the magnetic information storage medium has a smooth surface with surface roughness (Ra) below 50 Å in a landing zone of the medium. On the other hand, if the magnetic information storage medium has a rough surface with surface roughness (Ra) above 300 Å in the landing zone, there is a danger of occurrence of crash of the magnetic head. It is necessary, therefore, to control the height of projections or depressions on the surface in the landing zone to 50 Å to 300 Å and also to control an interval of such projections or depressions in the landing zone to 10 $\mu$m to 200 $\mu$m and the surface roughness (Ra) in the landing zone to 10 Å to 50 Å.

(4) Since the amount of lifting of the head tends to decrease to the order of 0.025 $\mu$m or below owing to improvement in the recording density of the magnetic information storage medium, a data zone on the surface of the magnetic information storage medium should have a surface roughness (Ra) of 1 Å to 5 Å which enables the head to maintain this amount of lifting.

(5) By reason of an increased longitudinal recording density, the magnetic information storage medium substrate should not have crystal anisotropy, a foreign matter or other defects and should have a dense, fine and homogeneous texture.

(6) The material of the magnetic information storage medium should have sufficient mechanical strength and hardness for standing a high speed rotation, contact with the head and use as a portable device such as a removable information storage device.

(7) As the longitudinal recording density of a magnetic information storage medium is increased, an extremely fine and precise magnetic thin film such as a perpendicular magnetic recording thin film is required. For satisfying such requirement, the material of the magnetic information storage medium substrate must not contain $Na_2O$, $K_2O$, $B_2O_3$, F or OH group ingredient in principle because these ingredients cause dispersion of ion of such ingredient during the thin film forming process with resulting deterioration in the characteristics of the magnetic thin film.

(8) The mateial of the magnetic information storage medium must have chemical durability against rinsing and etching with various chemicals.

(9) With respect to forming of the magnetic thin film, the magnetic information storage medium substrate should have a low thermal expansion characteristic within the range from $-10\times10^{-7}/°$ C. to $20\times10^{-7}/°$ C. for avoiding deterioration in the thin film characteristics due to sputtering and heat treatment during the film forming process.

Aluminum alloy has been conventionally used as a material of a magnetic information storage medium substrate. The aluminum alloy substrate, however, tends to produce a substrate surface having projections or spot-like projections and depressions during the polishing process due to defects inherent in the material. As a result, the aluminum alloy substrate is not sufficient in flatness. Further, since an aluminum alloy is a soft material, deformation tends to take place so that it cannot cope with the recent requirement for making the magnetic information storage medium such as a magnetic disk thinner and the requirement for high density recording because the magnetic information storage medium tends to be deformed by contact with the head with resulting damage to the recording contents.

As a material for overcoming this problem of the aluminum alloy substrate, known in the art are glass substate for magnetic information storage medium made of a chemically tempered glass such as a sodium lime glass ($SiO_2$—CaO—$Na_2O$) and alumino-silicate glass ($SiO_2$—$Al_2O_3$—$Na_2O$). These glass substrates, however, have the following disadvantages:

(1) Polishing is made after chemical tempering and so the tempered layer tends to cause instability in thinning the magnetic information storage medium.

(2) For improving the CSS characteristics, the substrate must be subjected to texturing which produce projections and depressions on the surface of the substrate. Since a mechanical processing or a thermal processing such as by laser beam cause a cracking or other defects due to distortion in the chemically tempered layer, texturing must be conducted by a chemical etching or sputtering but this prevents a large scale production of the product at a competitive cost.

(3) Since the $Na_2O$ or $K_2O$ ingredient is included as an essential ingredient in the glass, the magnetic thin film characteristics of the glass is deteriorated with the result that the substrate cannot cope with the requirement for increasing the surface recording density.

Aside from the aluminum alloy substrate and chemically tempered glass substrate, known in the art are some substrates made of glass-ceramics. For example, Japanese Patent Application Laid-open No. 6-329440 discloses a glass-ceramic of a $SiO_2$—$Li_2O$—MgO—$P_2O_5$ system which includes lithium disilicate ($Li_2O.2SiO_2$) and α-quartz (α-$SiO_2$) as predominant crystal phases. This glass-ceramic is an excellent material in that, by controlling the grain size of globular grains of α-quartz, the conventional mechanical texturing or chemical texturing becomes unnecessary and surface roughness (Ra) of a polished surface can be controlled within a range from 15 Å to 50 Å. This glass-ceramic cannot cope with the above described target surface roughness (Ra) of 1 Å to 5 Å and also cannot sufficiently cope with the above described tendency to lowering the flying height of a magnetic head necessitated by rapid increase in the recording capacity. Besides, in this glass-ceramic, no discussion about the landing zone to be described later in this specification is made at all.

Japanese Patent Application Laid-open No. 7-169048 discloses a photo-sensitive glass-ceramic of a $SiO_2$—$Li_2O$ system including Au and Ag as photo-sensitive metals characterized in that a data zone and a landing zone are formed on the surface of a magnetic disk substrate. A predominant crystal phase of this glass-ceramic is lithium silicate ($Li_2O.SiO_2$) and/or lithium disilicate ($Li_2O\ 2SiO_2$). In case lithium silicate is used, the glass-ceramic has a poor chemical durability so that it has a serious practical problem. Further, in forming of the landing zone, a part of the substrate (i.e., landing zone) is crystallized and is subjected to chemical etching by using 6% solution of HF. However, forming of the substrate with an uncrystallized part and a crystallized part makes the substrate instable mechanically as well as chemically. As for chemical etching by HF solution, it is difficult to control concentration of the HF solution because of evaporation and other reasons so that this method is not suitable for a large scale production of products.

Several methods are known for forming a landing zone and a data zone on the surface of a magnetic information storage medium. For example, Japanese Patent Applicaton Laid-open No. 6-290452 discloses a method for forming a landing zone on a carbon substrate by a pulsed laser having a wavelength of 523 nm. In this case, however, there are the following problems:

(1) A carbon substrate is formed by pressing at a high pressure and burning at a high temperature of about 2600° C. with resulting difficulty in a large scale production at a low cost.

(2) A carbon substrate is low in its mechanical properties (Young's modulus and fracture strength) so that it is difficult to cope with the thinning tendency and a high speed rotation of a drive.

(3) The forming of the landing zone utilizes oxidization and evaporation of carbon by the pulsed laser. Since carbon is a material which causes a very strong thermal oxidation reaction, the formed landing zone becomes instable and thus it poses a serious problem in reproduceability.

Japanese Patent Application Laid-open No. 7-65359 and U.S. Pat. No. 5062021 disclose a method for forming a landing zone on an aluminum alloy by a pulsed laser. The aluminum alloy has the above described problems. Besides, the surface of the substrate after irradiation of laser beam tends to have a defect due to oxidation of a molten portion and remaining of splash of molten metal on the surface. It is therefore difficult to put this method to a practical use.

Japanese Patent Application Laid-open No. 63-46622 discloses a hard disk for magnetic information storage using a pluality of low thermal expansion materials. This reference presents only a discussion about thermal distortion. As usable materials, 96% silica glass and quartz glass are shown but these materials are low in mechanical strength and are not very practical. Further, glass-ceramics which are presented as usable are generally known ones having the $Na_2O$ ingredient. No discussion is made in this reference about the problem about a magnetic thin film which is indispensable to cope with the tendency to high recording density. Neither is there discussion about the surface roughness of the surface of the substrate or the techniques about the ramp loading and the landing zone.

Japanese Patent Application Laid-open No. 6-92681 and Japanese Patent Application Laid-open No. 8-133783 disclose $SiO_2$—$Al_2O_3$—$SiO_2$ system low-expansion transparent glass-ceramics. These references are not aware of utility of such glass-ceramics as a magnetic information storage medium substrate and no discussion is made about the super flat surface of the substrate.

It is therefore an object of the invention to eliminate the disadvantages of the prior art technique and provide a magnetic information storage medium substrate which is suitable for the two techniques coping with the tendency to high recording density and has a super flat surface characteristic on the entire surface of the substrate which is particularly for the ramp loading system and also has two surface characteristics which enable a stable lifting of a magnetic head in a landing zone where the magnetic head starts and stops (contact start and stop) and enable a low flying height of the magnetic head in a data zone in conformity to the tendency to high recording density.

It is another object of the invention to provide a magnetic information storage medium formed by subjecting the magnetic information storage medium substrate to a thin film forming process.

SUMMARY OF THE INVENTION

Accumulated studies and experiments made by the inventor of the present invention for achieving the above described objects of the invention have resulted in the finding, which has led to the present application, that glass-ceramics obtained by subjecting to heat treatment, within a specific temperature range, a base glass of a $SiO_2$—$Al_2O_3$—$Li_2O$ system or a base glass of the same system and additionally containing at least one of $V_2O_5$, CoO, NiO, $Cr_2O_3$ and CuO as a coloring agent has a crystal phase of β-quartz solid solution (β-$SiO_2$ solid solution) or a mixed crystal of β-quartz solid solution (β-$SiO_2$ solid solution) and β-spodumene solid solution (β-$Li_2O.Al_2O_3.SiO_2$ solid solution) with fine globular crystal grains, has an excellent super flat surface roughness after polishing which is very advantageous for the ramp loading system and has an excellent processability by a laser (i.e., laser diode pumped solid-state laser or a $CO_2$ laser) which is very advantageous for the landing zone system.

For achieving the object of the invention, there is provided a glass-ceramic substrate for a magnetic information storage medium which has surface roughness (Ra) of a polished surface within a range form 1 Å to 5 Å in conformity with the ramp loading system according to which start and stop of a magnetic head are made in an area which is completely outside of the surface of the magnetic information storage medium.

In one aspect of the invention, the glass-ceramic substrate having a landing zone and a data zone in conformity with the landing zone system has projections or depressions formed by irradiation of laser beam in the landing zone.

In the case of the landing zone system, a laser diode pumped solid-state laser or a $CO_2$ laser is particularly preferable.

As the laser diode pumped solid-state laser, a Nd:YAG, Nd:YVO$_4$ or Nd:YLF laser may be used.

In another aspect of the invention, a wavelength of said laser diode pumpled solid-state laser is within a range of 0.2 μm–0.6 μm or within a range of 1.05 μm–1.40 μm.

In another aspect of the invention, percent transmission by the laser diode pumped solid-state laser of the wavelength within the range of 0.2 μm–0.6 μm or within the range of 1.05 μm–1.40 μm at a thickness of 0.635 mm is 0% to 10%.

In another aspect of the invention, surface roughness (Ra) of a polished surface of the data zone is within a range from 1 Å to 5 Å, a multiplicity of projections or depressions are formed by irradiation of laser beam in the landing zone, height of the projections or depressions formed is whtin a range from 50 Å to 300 Å, surface roughness (Ra) of the landing zone is within a range from 10 Å to 50 Å.

In another aspect of the invention, interval of projections or depressions having the height of 50 Å to 500 Å in the landing zone formed by irradiation of laser beam is within a range from 10 μm to 200 μm.

In another aspect of the invention. the glass-ceramic of the magnetic information storage medium substrate comprises a $SiO_2$—$Al_2O_3$—$Li_2O$ system glass-ceramic and has either β-quartz solid solution (β-$SiO_2$ solid solution) or a mixture of β-quartz solid solution (β-$SiO_2$ solid solution) and β-spodumene solid solution (β-$Li_2O.Al_2O_3.4SiO_2$ solid solution) as its main crystal phase.

In another aspect of the invention, the glass-ceramic of the magnetic information storage medium substrate comprises a $SiO_2$—$Al_2O_3$—$Li_2O$ system glass-ceramic and having either β-quartz solid solution (β-$SiO_2$ solid solution) or a mixture of β-quartz solid solution (β-$SiO_2$ solid solution) and β-spodumene solid solution (β-$Li_2O.Al_2O_3.4SiO_2$ solid solution) as its main crystal phase and the crystal grain of the β-quartz solid solution and β-spodumene solid solution has a diameter within a range from 200 Å to 5000 Å.

In another aspect of the invention, the glass-ceramic of the magnetic information storage medium substrate has surface roughness (Ra) within a range from 1 Å to 5 Å.

In another aspect of the invention, the glass-ceramic is obtained by heat treating a base glass consisting in weight percent of:

| | |
|---|---|
| $SiO_2 + P_2O_5$ | 56–65% |
| in which $SiO_2$ | 50–60% |
| $P_2O_5$ | 6–10% |
| $Al_2O_3$ | 22–26% |
| $Li_2O$ + MgO + ZnO | 4.0–6.5% |
| in which $Li_2O$ | 3–5% |
| MgO | 0.6–2% |
| ZnO | 0.5–2% |
| CaO + BaO | 0.5–5% |
| in which CaO | 0–4% |
| BaO | 0.5–3% |
| $TiO_2$ | 1–4% |
| $ZrO_2$ | 1–4% |
| $As_2O_3$ | 0–2% |
| $Sb_2O_3$ | 0–2% | wherein the weight ratio of $P_2O_5$ to $SiO_2$ is between 0.10 and 0.17, said glass-ceramic containing either β-quartz solid solution (β-$SiO_2$ solid solution) or a mixture of β-quartz solid solution (β-$SiO_2$ solid solution) and β-spodumene solid solution (β-$Li_2O.Al_2O_3.4SiO_2$ solid solution) as its main crystal phase.

In another aspect of the invention, the glass-ceramic is obtained by heat treating a base glass consisting in weight percent of:

| | |
|---|---|
| $SiO_2 + P_2O_5$ | 56–65% |
| in which $SiO_2$ | 50–60% |
| $P_2O_5$ | 6–10% |
| $Al_2O_3$ | 22–26% |
| $Li_2O$ + MgO + ZnO | 4.0–6.5% |
| in which $Li_2O$ | 3–5% |
| MgO | 0.6–2% |

-continued

| | |
|---|---|
| ZnO | 0.5–2% |
| CaO + BaO | 0.5–5% |
| in which CaO | 0–4% |
| BaO | 0.5–3% |
| $TiO_2$ | 1–4% |
| $ZrO_2$ | 1–4% |
| $As_2O_3$ | 0–2% |
| $Sb_2O_3$ | 0–2% |
| $V_2O_5 + CoO + NiO + Cr_2O_3 + CuO$ | 1–4% |
| $V_2O_5$ | 0–3% |
| CoO | 0–3% |
| NiO | 0–3% |
| $Cr_2O_3$ | 0–3% |
| CuO | 0–3% | wherein the weight ratio of $P_2O_5$ to $SiO_2$ is between 0.10 and 0.17, said glass-ceramic containing either β-quartz solid solution (β-$SiO_2$ solid solution) or a mixture of β-quartz solid solution (β-$SiO_2$ solid solution) and β-spodumene solid solution (β-$Li_2O.Al_2O_3.4SiO_2$ solid solution) as its main crystal phase.

In another aspect of the invention, said glass-ceramic is obained by melting, forming and annealing glass-materials and subjecting the formed base glass to heat treatment for producing a crystal nucleus under a temperature within a range from 650° C. to 750° C. and for crystallization under a temperature within a range from 750° C. to 950° C. and has a coeffiicent of thermal expansion within a range between $-10 \times 10^{-7}/°$ C. and $+20 \times 10^{-7}/°$ C. at a temperature within a range from –60° C. to +600° C.

In still another aspect of the invention, there is provided a magnetic information storage medium having a thin film of a magnetic media formed on the glass-ceramic substrate having the above described features.

DETAILED DESCRIPTION OF THE INVENTION

The composition of the glass-ceramic substrate of the invention is expressed on the basis of composition of oxides as in its base glass. The above described content ranges of the respective ingredients have been selected for the reasons stated below.

The $SiO_2$ ingredient is an important ingredient which produces β-quartz solid solution (β-$SiO_2$ solid solution) and β-spodumene solid solution (β-$Li_2O.Al_2O_3.4SiO_2$ solid solution) as its main crystal phase when the base glass is subjected to heat treatment. If the amount of this ingredient is below 50%. the crystal produced in the glass-ceramic is instable and its texture tends to become too rought with resulting decrease in the mechanical strength and coarseness in the surface roughness after polishing. If the amount of this ingredient exceeds 60%, difficulty arises in melting and forming the base glass.

The $P_2O_5$ ingredient is effective, when it coexists with the $SiO_2$ ingredient, for improving melting property and clarity of the base glass. If the amount of this ingredient is below 6%. this effect cannot be attained whereas if the amount of this ingredient exceeds 10%, devitrification occurs in the base glass and the texture of the glass-ceramic becomes rough. For attaining the highest effect, the total amount of the $SiO_2$ ingredient and the $P_2O_5$ ingredient should be within a range of 56–65% and the weight ratio of $P_2O_5$ to $SiO_2$ should be between 0.10 and 0.17.

The $Al_2O_3$, improves the melting property and chemical durability of the glass-ceramic. If the amount of this ingredient is below 22%, melting of the base glass becomes difficult and sufficient chemical durability cannot be attained. If the amount of this ingredient exceeds 26%, the melting property is deteriorated and devitrification occurs.

The three ingredients of $Li_2O$, MgO and ZnO are important ingredients whch constitute the β-quartz solid solution crystal. These ingredients, when they coexist with the limited effects of the $SiO_2$ and $P_2O_5$ ingredients, improve the low thermal expansion characteristic of the glass-ceramic and improve the melting property and clarity of the base glass. If the amount of the $Li_2O$ ingredient is below 3%, these effects cannot be attained and, further, difficulty arises in precipitation of the above described target crystal phase. If the amount of this ingredient exceeds 5%, the low thermal expansion characteristic cannot be attained and devitrification of the base glass is deteriorated. If the amount of the MgO ingredient is below 0.6%, the above described effect cannot be attained whereas if the amount of this ingredient exceeds 2%, the low thermal expansion characteristic cannot be attained. If the amount of the ZnO ingredient is below 0.5%, the above described effect cannot be attained whereas if the amount of this ingredient exceeds 2%, the low thermal expansion characteristic cannot be attained and devitrification of the base glass is deteriorated. For attaining the highest effect, the total amount of the $Li_2O$, MgO and ZnO ingredients should be within a range of 4.0–6.5%.

The CaO and BaO ingredients remain as a glass matrix left after precipitation of the crystal in the glass-ceramic. These ingredients are important for fine adjustment between the crystal phase and the glass matrix. If the amount of the CaO ingredient exceeds 4%, the target crystal phase cannot be produced and, besides, devitrification occurs in the base glass. If the amount of the BaO ingredient is below 0.5%, this effect cannot be attained whereas if the amount of this ingredient exceeds 3%, the melting property of the base glass is deteriorated and devitrifcation occurs. For attaining the highest effect, the total amount of the CaO and BaO ingredients should be within a range of 0.5–5%.

The $TiO_2$ and $ZrO_2$ ingredients are indispensable as nucleating agents. If the amount of the respective ingredient is below 1%, the desired crystal phase cannot be precipitated whereas if the amount of the respective ingredient exceeds 4%, the melting property of the base glass is deteriorated with resulting occurrence of an unmolten portion.

The $As_2O_3$ and $Sb_2O_3$ ingredients may be added as a refining agent in melting the glass for obtaining a homogeneous product. It will suffice if each ingredient up to 2% is added.

In the present invention, in case forming of projections or depressions in the landing zone is made by the laser diode pumped solid-state laser, it is indispensable to add a coloring agent for absorption of the laser beam. In case the projections or depressions are formed by the $CO_2$ laser, the addition of the coloring agent is unnecessary but the $CO_2$ laser beam may be irradiated on the system containing a coloring agent.

In the present invention, at least one ingredient of $V_2O_5$, CoO, NiO, $Cr_2O_3$ and CuO is used as a coloring agent.

If the amount of each ingredient exceeds 3% crystals grown tend to have a large diameter and devitrification occurs in the base glass. If the total amount of the respective ingredients is below 1%, the percent transmission which is the object of the invention cannot be attained so that difficulty arises in the processing by the laser. If the total amount of the respective ingredients exceeds 4%, devitrification is deteriorated in the base glass and difficulty arises in a large scale production.

It has been found that, for performing sufficient heating without using an excessively high laser power by using the laser diode pumped solid-state laser of the wavelength within the range of 0.2 μm–0.6 μm or within the range of 1.05 μm–1.40 μm, a proper percent transmission range at a thickness of 0.635 mm is 0% to 10%. By using the percent transmission of this range, the laser beam irradiation time can be held at the minimum and, as a result, an excessive stress is not produced in the surface portion of the substrate whereby forming of projections or depressions can be achieved in a stable manner while ensuring a large scale production of the substrate.

For manufacturing the glass-ceramic substrate for a magnetic information storage medium, the base glass having the above described composition is subjected to heat forming and/or cold forming, is heat treated for producing a crystal nucleus under a temperature within a range from 650° C. to 750° C. and is further heat treated for crystallization under a temperature within a range from 750° C. to 950° C.

The main crysal phase of the glass-ceramic thus obtained by the heat treatment is either β-quartz solid solution (β-$SiO_2$ solid solution) or a mixture of β-quartz solid solution (β-$SiO_2$ solid solution) and β-spodumene solid solution (β-$Li_2O.Al_2O_3.4SiO_2$ solid solution). These crystal grains have a globular grain structure and the grain diameter of each of the system containing a color agent and the system containing no coloring agent is within a range from 200 Å to 5000 Å. The glass-ceramic has a coefficient of thermal expansion within a range between $-10^{-7}$° C. and $20 \times 10^{-7}$/° C. at a temperature within a range from −60° C. to +600° C.

The glass-ceramic obtained by the above described heat treatment is subjected to conventional lapping and polishing processes and thereupon a glass-ceramic substrate for a magnetic information storage medium having a surface roughness (Ra) within a range from 1 Å to 5 Å is provided.

In the case of the landing zone system, the glass-ceramic is then subjected to the process of forming of projections or depressions in the landing zone by a laser diode pumped solid-state laser or a $CO_2$ laser.

The laser wavelength of the laser diode pumped solid-state laser in this case is limited to either 0.2 μm–0.6 μm or 1.05 μm–1.40 μm. By irradiation of laser beam of this wavelength, projections or depressions having height within a range from 50 Å to 300 Å and a surface roughness (Ra) within a range from 10 Å to 50 Å are formed in the ladning zone at an interval within a range from 10 μm to 200 μm. Thus, a glass-ceramic substrate for a magnetic information storage medium as shown in FIG. 1 which has a landing zone formed with projections or depressions having height within a range from 50 Å to 300 Å and a data zone which has an excellent smooth surface can be provided. In FIG. 1, a glass-ceramic substrate 1 has a landing zone 3 provided outside of a central opening 5 and a data zone 2 provided outside of the landing zone 3. Reference character 4 designates a portion called "ring" formed inside of the landing zone 3. FIG. 2 shows a shape of projections or depressions formed in the landing zone. FIG. 3 shows a shape of projections formed in the landing zone. FIG. 4 shows interval of projections or depressions formed in the landing zone. FIG. 5 shows height of projections or depressions formed in the landing zone.

Lasers generally used for surface change such as cutting, welding and microprocessing of a material are classified to an Ar laser, a $CO_2$ laser, an eximer laser and a laser diode pumped solid-state laser. It has been found that, in the laser processing for the glass-ceramic of the invention, suitable lasers are limited to the laser diode pumped solid-state laser and $CO_2$ laser because the Ar laser and excimer laser produce an unsuitable shape defect due to splashing of molten material.

For forming projections or depressions in the landing zone by the laser diode pumped solid-state laser or the $CO_2$ laser, a polished glass-ceramic substrate is rotated in a state clamped by a spindle and pulsed laser beam is irradiated vertically on the surface of the landing zone at a predetermined interval.

In irradiating the pulsed laser, a spot diameter within a range from 2 μm to 50 μm is used in the case of the laser diode pumped solid-state laser and a spot diam-ter within a range from 15 μm to 50 μm is used in the case of the $CO_2$ laser. Laser irradiation conditions such as laser output and pulse width are controlled in accordance with the composition of the glass-ceramic under processing.

Principal conditions which affect forming of projections or depressions on the substrate surface by irradiation of laser beam are (1) laser output, (2) length of laser pulse and (3) laser spot diameter, i.e., the area of irradiation on the substrate surface. As for the material of the substrate for which the laser diode pumped solid-state laser is used, the absorption characteristics at the laser wavelength used (0. 2 μm–0.6 μm or 1.05 μm–1.40 μm), low percent transmission at the laser wavelength used, is the most important factor. For example, a substrate made of an ordinary glass in which no crystal is grown does not selectively absorb the used wavelength of a laser diode pumped solid-state laser and therefore the surface of the substrate is not heated up with the result that no projections or depressions can be formed.

The glass-ceramic substrate formed with projections or depressions in the landing zone by the laser processing is then subjected to a thin film forming process which is known per se and thereby is formed into a high recording density magnetic information storage medium. More specifically, the glass-ceramic substrate is heated in vacuum and then is coated, by a sputtering process, with an intermediate layer of cromium, a magnetic layer of cobalt alloy and a protective layer of carbon and then is coated again with a lubricating material layer on the surface of the protective layer to provide a magnetic information storage medium.

Examples of the present invention will be described below with reference to the accompanying drawings.

BRIEF DESCRIPTION OF THE DRAWINGS

In the accompanying drawings.

EXAMPLES

Figure 1:
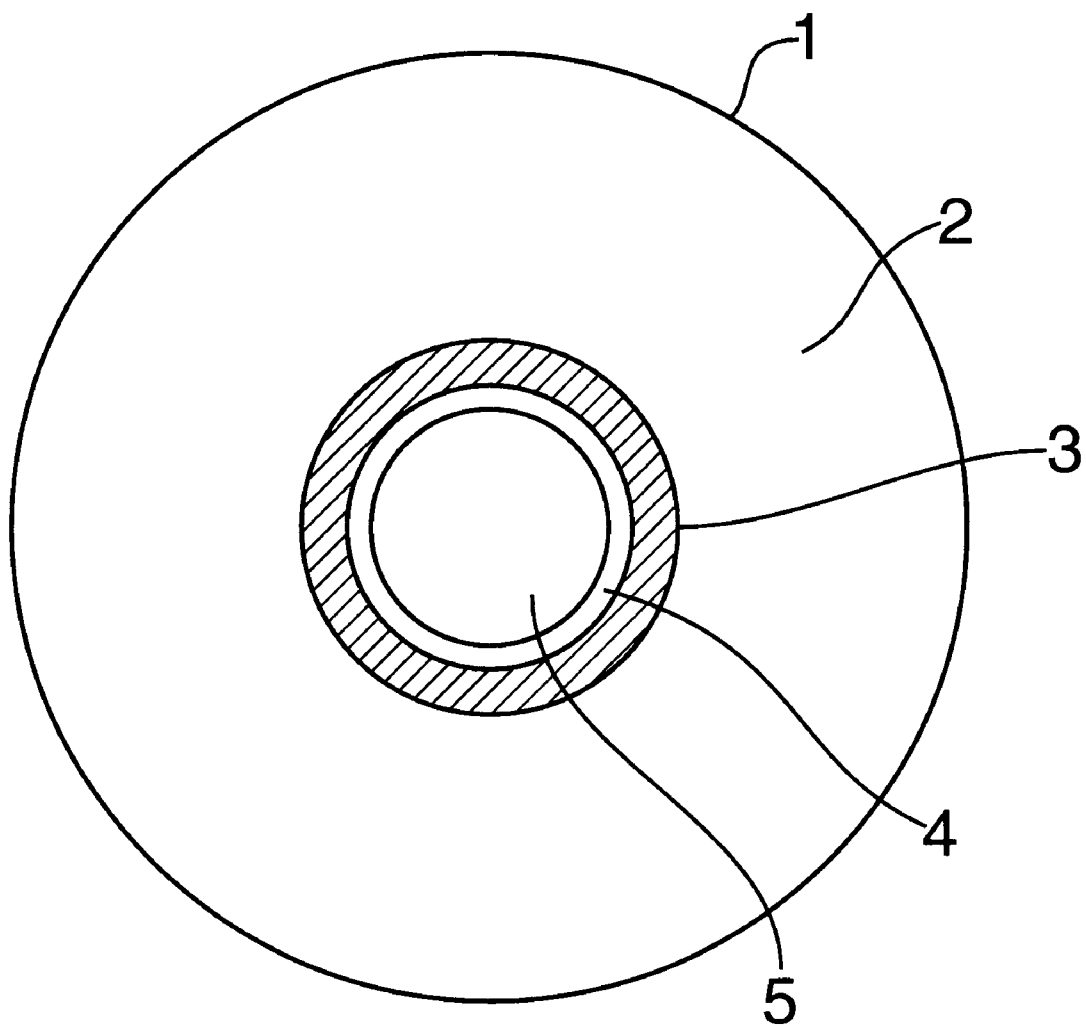
FIG. 1 is a top plan view of the state of a landing zone and a data zone formed outside of a central opening of a glass-ceramic substrate for a magnetic information storage medium according to the invention.
Figure 2:
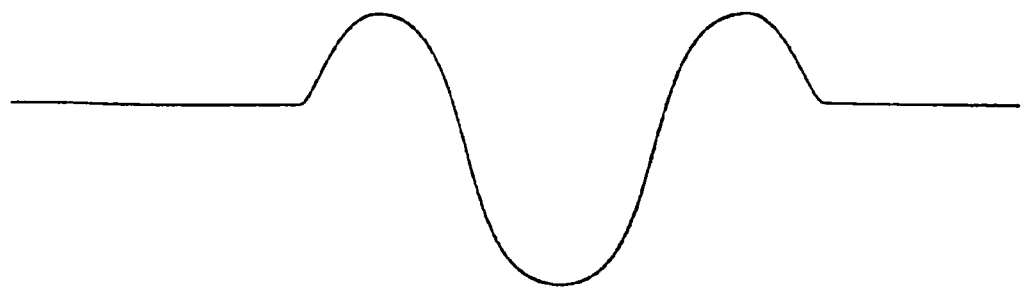
FIG. 2 is a sectional view showing the shape of projections and depressions formed in the landing zone.
Figure 3:
FIG. 3 is a sectional view showing the shape of projections formed in the landing zone.
Figure 4:
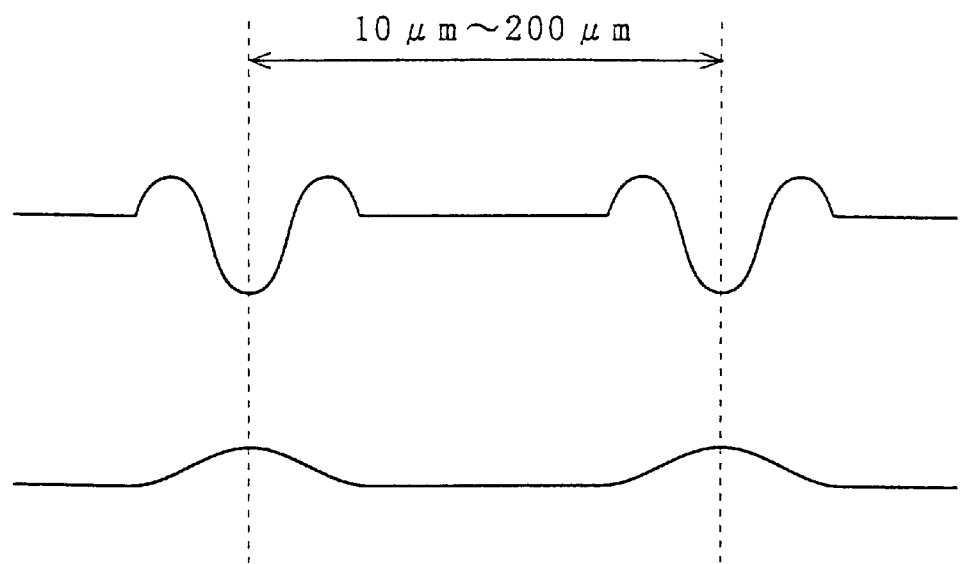
FIG. 4 is a sectional view showing the interval of projections and depressions formed in the landing zone.
Figure 5:
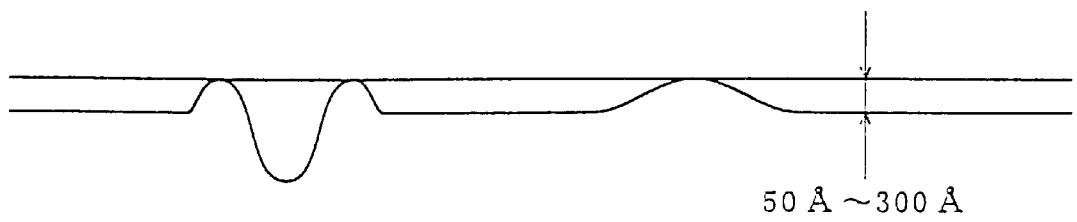
FIG. 5 is a sectional view showing the height of projections and depressions formed in the landing zone.

Tables 1 to 4 show examples (No. 1 to No. 9) of compositions of a magnetic information storage medium substrate of the landing zone system made according to the invention and two comparative examples of the prior art $Li_2O$–$SiO_2$ system glass-ceramics (Japanese Patent Application Laid-open No. Sho 62-72547, Comparative Example 1 and Japanese Patent Application Laid-open No. Sho 63-210039, Comparative Example 2) together with the temperature of nucleation, temperature of crystallization, coloer appearance of the glass-ceramic, predominant crystal phase, diameter of crystal grains, shape of crystal grains, average percent transmission of laser wavelength 0.2 μm–0.6 μm and 1.05 μm–1.40 μm at a plate thickness of 0.635 mm, type of the laser used in forming of the landing zone, wavelength used, height of projections or depressions formed by irradiation of laser beam, surface roughness (Ra) of the landing zone, surface roughness (Ra) the data zone after polishing, and a coefficient of thermal expansion of the glass-ceramics.

TABLE 1

| | Examples | | |
|---|---|---|---|
| | 1 | 2 | 3 |
| $SiO_2$ | 55.0 | 54.0 | 53.0 |
| $P_2O_5$ | 8.0 | 8.0 | 7.0 |
| $Al_2O_3$ | 24.0 | 24.0 | 23.0 |
| $Li_2O$ | 4.0 | 4.0 | 4.0 |
| MgO | 1.0 | 1.0 | 0.7 |
| ZnO | 0.5 | 0.5 | 0.8 |
| CaO | 1.0 | 1.0 | 1.0 |
| BaO | 1.0 | 1.0 | 1.0 |
| $TiO_2$ | 2.5 | 2.5 | 2.3 |
| $ZrO_2$ | 2.0 | 2.0 | 1.8 |
| $As_2O_3$ | 1.0 | 1.0 | |
| $Sb_2O_3$ | | | 1.0 |
| $V_2O_5$ | | 1.0 | 0.4 |
| CoO | | | 1.5 |
| NiO | | | 1.5 |
| $Cr_2O_3$ | | | 1.0 |
| CuO | | | |
| Nucleation temperature (° C.) | 750 | 730 | 700 |
| Crystallization temperature (° C.) | 800 | 900 | 850 |
| Color appearance | transparent | black | black |
| Crystal phase & grain diameter | β-quartz solid sol. 250 Å | β-quartz solid sol. 320 Å | β-quartz solid sol. 1500 Å |

TABLE 1-continued

| | Examples | | |
|---|---|---|---|
| | 1 | 2 | 3 |
| Shape of crystal grain | globular | β-spodumene 1000 Å globular | globular |
| Average percent transmission at 0.635 mm thickness | | | |
| 0.2 μm to 0.6 μm | 80% | 0% | 0% |
| 1.05 μm to 1.40 μm | 90% | 0% | 0% |
| Type of laser | $CO_2$ | Nd:YAG | Nd:YVO$_4$ |
| wavelength | 10.5 μm | 1.064 μm | 1.064 μ |
| Height of projections or depressions | 150 Å | 200 Å | 120 Å |
| Surface roughness (Ra) of landing zone | 14 Å | 16 Å | 13 Å |
| Surface roughness (Ra) of data zone | 2 Å | 3 Å | 1 Å |
| Coefficient of thermal expansion (×10$^{-7}$ ° C.) (−60° C.−+600° C.) | 2 | 10 | 15 |

TABLE 2

| | Examples | | |
|---|---|---|---|
| | 4 | 5 | 6 |
| $SiO_2$ | 55.0 | 53.0 | 58.0 |
| $P_2O_5$ | 7.0 | 7.0 | 6.5 |
| $Al_2O_3$ | 24.0 | 23.0 | 22.5 |
| $Li_2O$ | 4.0 | 3.8 | 4.2 |
| MgO | 1.0 | 0.6 | 0.7 |
| ZnO | 1.0 | 0.6 | 0.5 |
| CaO | 1.5 | 1.0 | 0.5 |
| BaO | 1.0 | 0.8 | 0.7 |
| $TiO_2$ | 2.5 | 2.3 | 2.0 |
| $ZrO_2$ | 2.0 | 1.8 | 1.5 |
| $As_2O_3$ | | | 1.0 |
| $Sb_2O_3$ | 1.0 | 0.8 | |
| $V_2O_5$ | | 1.0 | 1.0 |
| CoO | | 2.0 | |
| NiO | | 1.5 | 0.5 |
| $Cr_2O_3$ | | 0.5 | 0.4 |
| CuO | | 0.3 | |
| Nucleation temperature (° C.) | 740 | 730 | 750 |
| Crystallization temperature (° C.) | 830 | 920 | 880 |
| Color appearance | transparent | black | black |
| Crystal phase & grain diameter | β-quartz solid sol. 300 Å | β-quartz solid sol. 500 Å β-spodumene 3000 Å | β-quartz solid sol. 600 Å β-spod- umene 4000 Å |
| Shape of crystal grain | globular | globular | globular |
| Average percent transmission at 0.635 mm thickness | | | |
| 0.2 μm to 0.6 μm | 81% | 0% | 0% |
| 1.05 μm to 1.40 μm | 93% | 0% | 8% |
| Type of laser | $CO_2$ | Nd:YAG | Nd:YVO$_4$ |
| wavelength | 10.5 μm | 1.064 μm | 0.532 μm |
| Height of projections or depressions | 200 Å | 300 Å | 500 Å |
| Surface roughness | 18 Å | 25 Å | 40 Å |

TABLE 2-continued

|  | Examples | | |
| --- | --- | --- | --- |
|  | 4 | 5 | 6 |
| (Ra) of landing zone | | | |
| Surface roughness (Ra) of data zone | 5 Å | 4 Å | 3 Å |
| Coefficient of thermal expansion (×10⁻⁷ ° C.) (−60° C.−+600° C.) | 8 | 15 | 18 |

TABLE 3

|  | Examples | | |
| --- | --- | --- | --- |
|  | 7 | 8 | 9 |
| $SiO_2$ | 54.0 | 56.5 | 55.0 |
| $P_2O_5$ | 7.5 | 7.5 | 7.0 |
| $Al_2O_3$ | 24.0 | 23.5 | 23.0 |
| $Li_2O$ | 4.0 | 4.0 | 4.0 |
| MgO | 1.0 | 1.5 | 1.5 |
| ZnO | 0.5 | 0.5 | 0.5 |
| CaO | 1.0 | | |
| BaO | 1.0 | 1.0 | 1.0 |
| $TiO_2$ | 2.5 | 2.5 | 2.5 |
| $ZrO_2$ | 2.0 | 2.0 | 2.0 |
| $As_2O_3$ | 1.0 | 1.0 | 1.0 |
| $Sb_2O_3$ | | | |
| $V_2O_5$ | 1.0 | | 2.0 |
| CoO | 0.5 | | |
| NiO | | | 0.5 |
| $Cr_2O_3$ | | | |
| CuO | | | |
| Nucleation temperature (° C.) | 730 | 750 | 740 |
| Crystallization temperature (° C.) | 900 | 825 | 860 |
| Color appearance | black | transparent | black |
| Crystal phase & grain diameter | β-quartz solid sol. 320 Å β-spodumene 1000 Å | β-quartz solid sol. 240 Å | β-quartz solid sol. 400 Å α-cristo- balite |
| Shape of crystal grain | globular | globular | globular |
| Average percent transmission at 0.635 mm thickness | | | |
| 0.2 μm to 0.6 μm | 0% | 81% | 0% |
| 1.05 μm to 1.40 μm | 0% | 92% | 0% |
| Type of laser wavelength | Nd:YAG 0.266 μm | $CO_2$ 10.5 μm | Nd:YVO₄ 1.064 μm |
| Height of projections or depressions | 200 Å | 150 Å | 250 Å |
| Surface roughness (Ra) of landing zone | 17 Å | 15 Å | 22 Å |
| Surface roughness (Ra) of data zone | 2 Å | 3 Å | 4 Å |
| Coefficient of thermal expansion (×10⁻⁷ ° C.) (−60° C.−+600° C.) | 10 | 5 | 10 |

TABLE 4

|  | Comparative Examples | |
| --- | --- | --- |
|  | 1 | 2 |
| $SiO_2$ | 71.0 | 82.0 |
| $P_2O_5$ | 1.9 | 2.5 |
| $Al_2O_3$ | 9.6 | 3.1 |
| $Li_2O$ | 12.0 | 8.5 |
| MgO | | 1.5 |
| ZnO | | |
| CaO | 0.4 | |
| BaO | | |
| $TiO_2$ | | |
| $ZrO_2$ | | |
| $As_2O_3$ | | 0.3 |
| $Sb_2O_3$ | | |
| $Na_2O$ | 3.8 | 1.6 |
| SrO | 0.4 | |
| $K_2O$ | | 3.6 |
| PbO | 0.9 | |
| Nucleation temperature (° C.) | 550 | 540 |
| Crystallization temperature (° C.) | 780 | 800 |
| Color appearance | white | white |
| Crystal phase & grain diameter | $Li_2Si_2O_5$ 1.2 μm α-cristobalite 0.5 μm | $Li_2Si_2O_5$ 1.5 μm α-cristobalite 0.3 μm |
| Shape of crystal grain | $Li_2Si_2O_5$ acicular α-cristobalite globular | $Li_2Si_2O_5$ acicular α-cristobalite globular |
| Average percent transmission at 0.635 mm thickness | | |
| 0.2 μm to 0.6 μm | 45% | 48% |
| 1.05 μm to 1.40 μm | 87% | 86% |
| Type of laser wavelength | | |
| Height of projections or depressions | | |
| Surface roughness (Ra) of landing zone | | |
| Surface roughness (Ra) of data zone | 14 Å | 12 Å |
| Coefficient of thermal expansion (×10⁻⁷ ° C.) (−60° C.−+600° C.) | 110 | 115 |

For manufacturing the glass-ceramic substrate of the above described examples, materials including oxides, carbonates and nitrates are mixed and molten in a conventional melting apparatus at a temperature within the range from about 1450° C. to about 1500° C. The molten glass is stirred to homogenize it and thereafter formed into a disk shape and annealed to provide a formed glass. Then, this formed glass is subjected to heat treatment to produce the crystal nucleus under a temperature within the range from 700° C. to 750° C. and then is subjected to further heat treatment for crystallization under a temperature within the range from 800° C. to 920° C. to produce the desired glass-ceramic. Then, this glass-ceramic is lapped with lapping grains having average grain diameter ranging from 5 μm to 30 μm and then is finally polished with cerium oxide having average grain diameter ranging from 0.2 μm to 2 μm. Then, for forming of projections or depressions in the landing zone, the polished glass-ceramic substrate is subjected to the laser processing with a laser diode pumped solid-state laser or a $CO_2$ laser fixed in position and pulsed laser being irradiated while the glass-ceramic substrate is rotated.

The irradiation of pulsed laser is performed with the condition such as laser wavelength, laser output, laser beam spot diameter, focus and laser pulse width etc. being controlled suitably in accordance with the specific composition of the glass-ceramic substrate.

As to Examples Nos. 1–9, the surface roughness (Ra) of the landing zone and the data zone and height of projections or depressions of the landing zone were measured with the AFM (atomic force microscope).

Figure 6:
FIG. 6 shows an SEM (scanning electron microscope) image of the crystal structure of the glass-ceramic of Example 2 of the present invention after HF etching.
Figure 7:
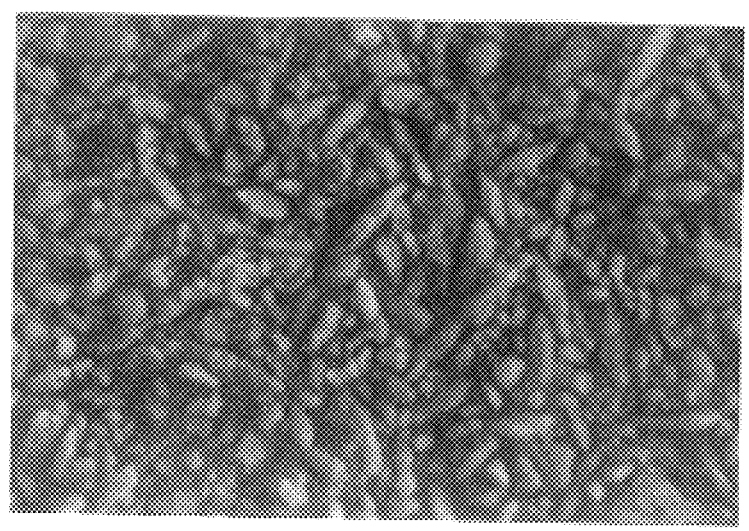
FIG. 7 shows an SEM image of the crystal structure of Comparative Example 2 of a prior art glass-ceramic after HF etching.

As shown in Tables 1 to 4 and FIGS. 6 and 7, the examples of the present invention and the comparative examples of the prior art $Li_2O$—$SiO_2$ system differ entirely from each other in the crystal phase and the shape of the crystal grains. In the glass-ceramics of the present invention, the β-quartz solid solution and the β-spodumene solid solution have a globular crystal grain structure with a small grain diameter. In contrast, in the glass-ceramics of the Comparative Examples 1 and 2, the lithium disilicate crystal has an acicular grain structure with a large grain diameter of 1.0 μm or more. In a situation in which a smoother surface is required, this crystal grain structure and grain diameter of the comparative examples adversely affect the surface roughness after polishing and produce defects due to coming off of the crystal grains from the substrate. Thus, it is diffiucit to obtain a surface roughness of 12 Å or less in the glass-ceramics of the Comparative Examples 1 and 2.

Figure 8:
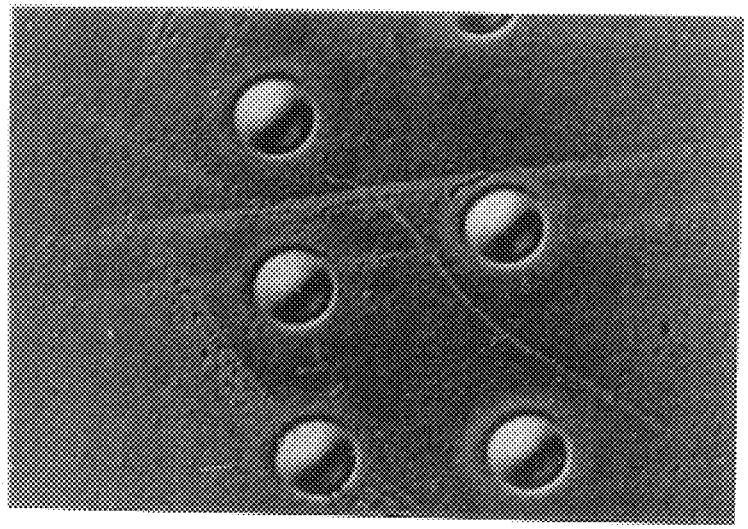
FIG. 8 is an SEM image of the projections and depressions of Example 2 after irradiation of laser beam by a laser diode pumped solid-state laser (Nd-YAG laser with laser wavelength of 1.064 μm)
Figure 9:
FIG. 9 is an SEM image of the projections of Example 1 after irradiation of laser beam by a $CO_2$ laser.
Figure 10:
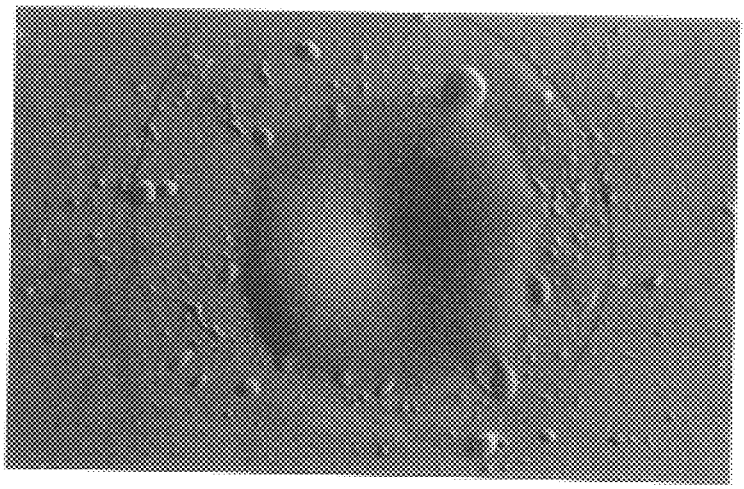
FIG. 10 is an SEM image of a prior art aluminosilicate chemically tempered glass after irradiation of laser beam by a laser diode pumped solid-state laser (Nd-YAG laser with laser wavelength of 0.266 μm)
Figure 11:
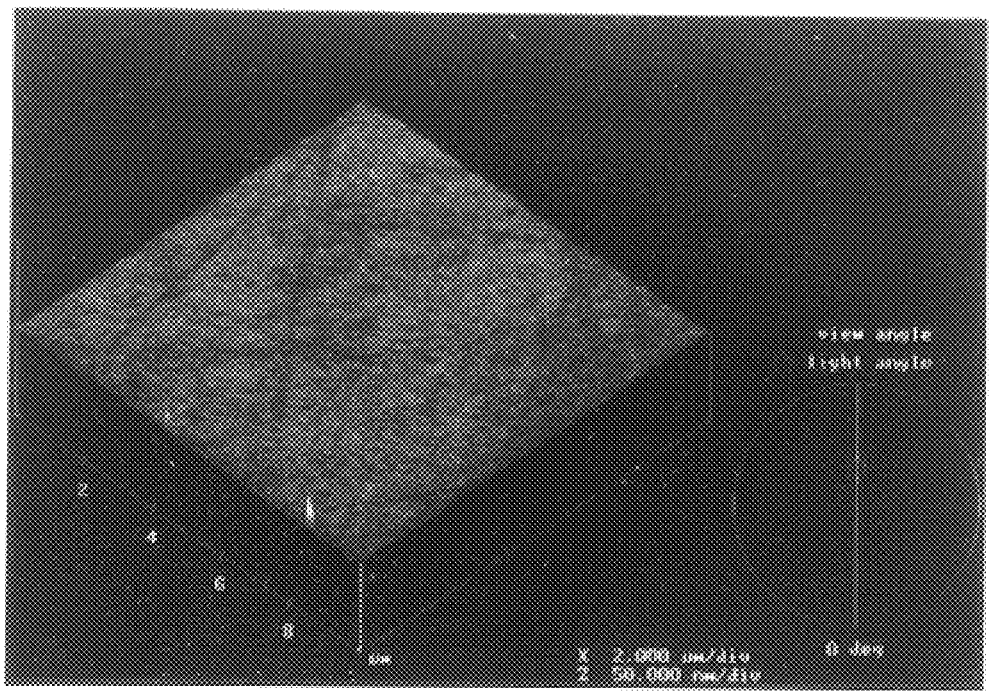
FIG. 11 is an AFM (atomic force microscope) image and the surface roughness (Ra) of the data zone of Exmple 1.

As regards the surface roughness shown in FIGS. 8 to 10, a laser processing resulting in forming of projections or depressions having a uniform and desirable shape as shown in FIGS. 8 and 9 can be realized in the glass-ceramic substrate according to the invention in contrast to the above described defects produced in the prior art aluminum substrate and chemically tempered glass substrate. As will be apparent from FIG. 10 showing the prior art alumino-silicate glass ($SiO_2$—$Al_2O_3$—$Na_2O$, $K_2O$ ion exchange), the alumino-silicate glass exhibits an instable and ununiform surface state after the processing by the laser. In the alumino-silicate chemically tempered glass shown in FIG. 10, sufficient heating was not achieved by laser irradiation by the laser diode pumped solid-state laser (Nd:YAG) at laser wavelength of 1.064 μm and 0.523 μm and the laser processing was made at wavelength of 0.266 μm. The result was an instable and ununiform surface state shown in FIG. 10.

It is considered that the glass-ceramic according to the invention is superior in resistance to heat to the chemically tempered glass which is in an amorphous state, has no strain change between the tempered surface layer and the untempered interior layer which is peculiar to the chemically tempered glass and has a crystal phase which can prevent growth of microcracks which are produced by various external actions and, as a total effect of these advantages, has the improved property of forming projections or depressions by irradiation of laser beam.

Figure 12:
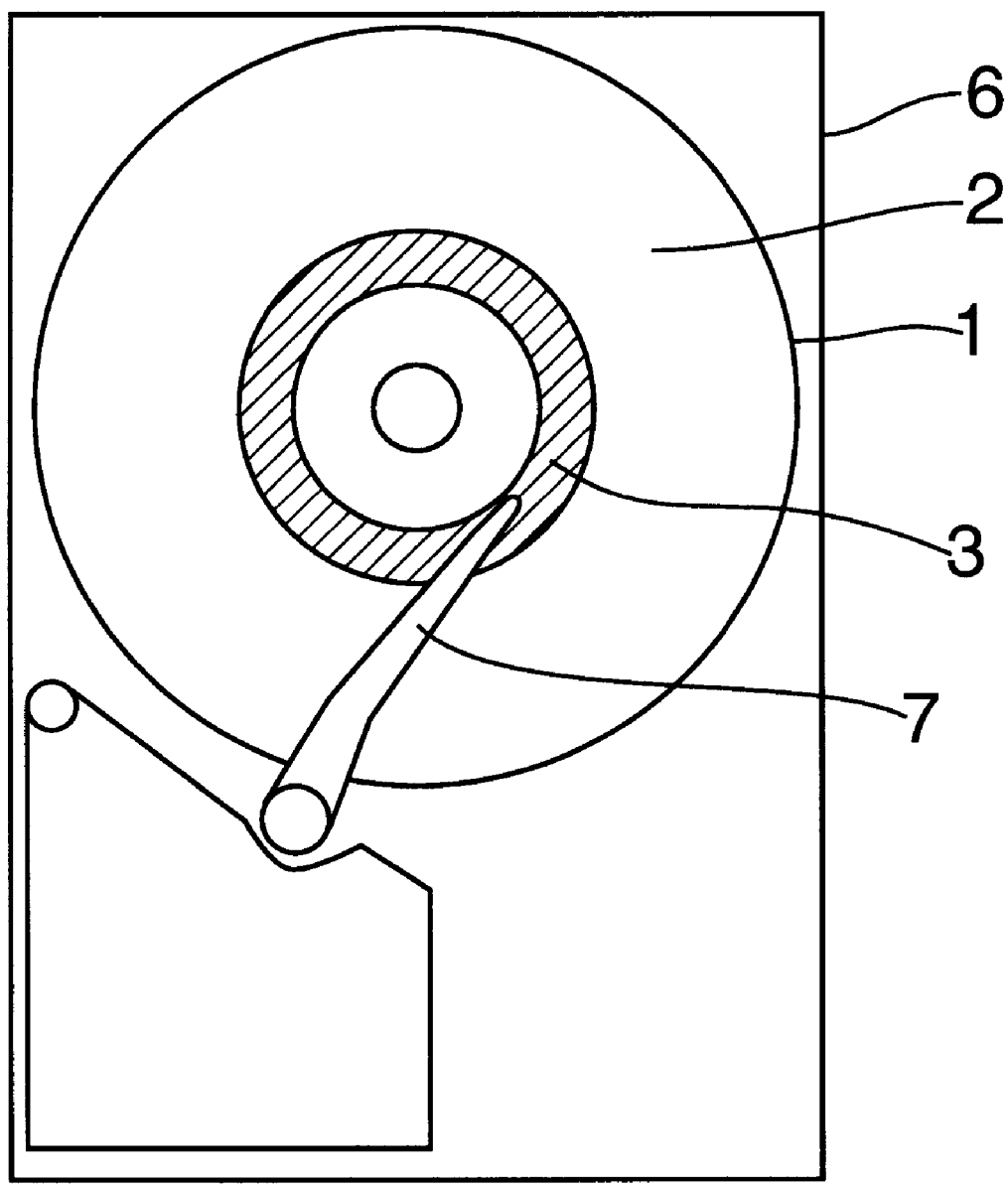
FIG. 12 is a schematic view showing an information storage device of the landing zone system in whch start and stop of a magnetic head are made in the landing zone.

FIG. 12 shows an information storage device (e.g., a hard disk device of a personal computer) of the landing zone system as an example of employing the magnetic information storage medium according to the invention, In FIG. 12, a magnetic information storage medium 1 has a data zone 2 and a landing zone 3. The magnetic information storage medium 1 is rotatably mounted on an information storage device 6. A magnetic head 7 is pivotably mounted on the magnetic information storage device 6. The magnetic head 7 starts in the landing zone 3, performs recording or reproduction of data in the data zone 2 in a low flying height state or in a contact state and thereafter returns to the landing zone 3 and stops.

The examples of the magnetic information storage medium substrate of the landing system may be used, without being subjected to the processing for forming the landing zone by the laser, as a magnetic information storage medium substrate of the ramp loading system.

Figure 13:
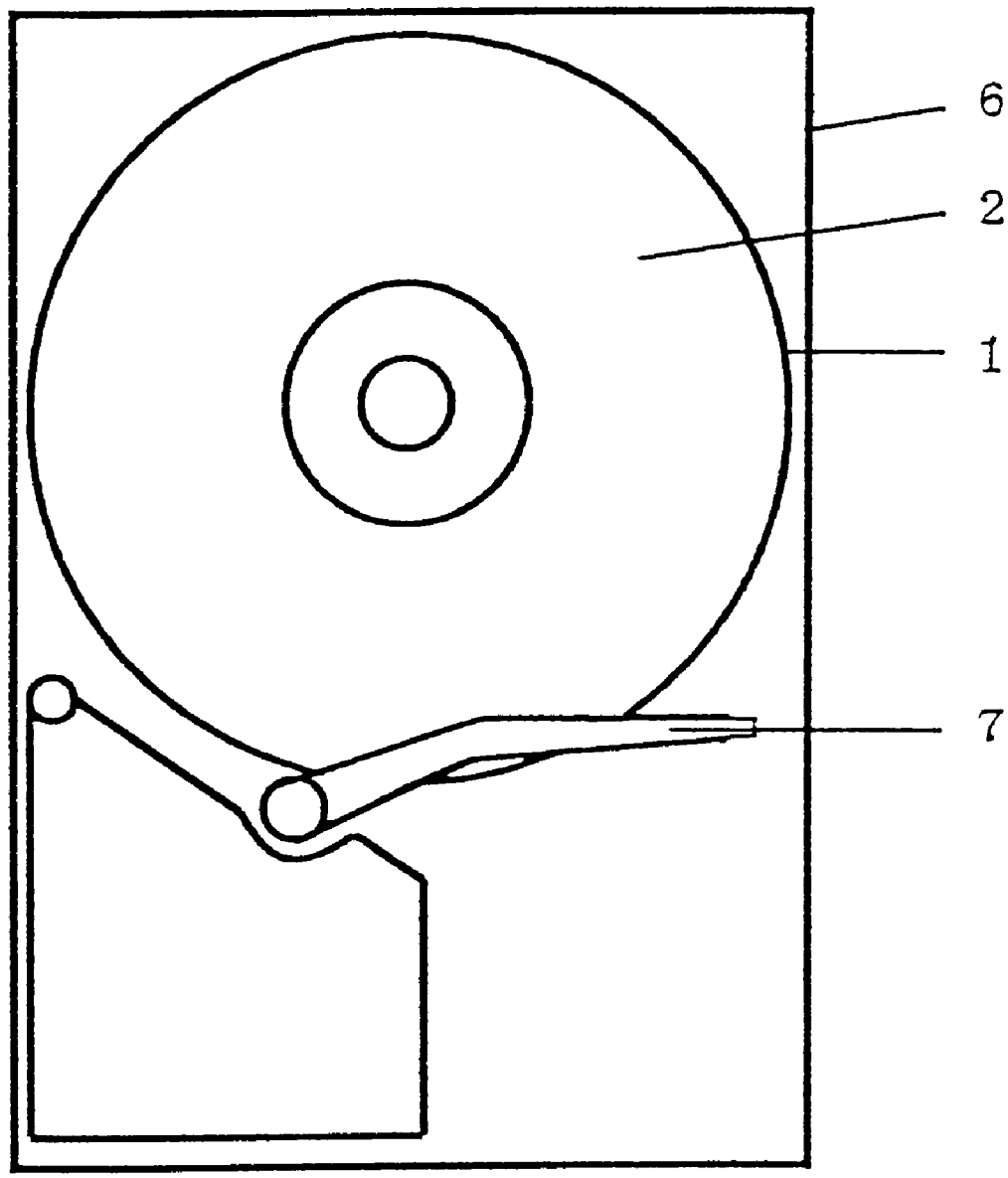
FIG. 13 is a schematic view showing an information storage device of the ramp loading system in which start and stop of a magnetic head are made in an area outside of the magnetic information storage medium.

FIG. 13 shows an information storage device (e.g., a hard disk device of a personal computer) using a magnetic information storage medium of the ramp loading system.

In FIG. 13, the same component parts as those shown in FIG. 12 are designated by the same reference characters and description thereof will be omitted. In this system, start and stop of the magnetic head 7 are made in an area which is outside of the illustrated magnetic information storage medium 1. More specificallyt, the magnetic head 7 starts in the area which is outside of the illustrated information storage medium 1, performs recording or reproduction of data in the data zone 2 in a low flying height state or in a contact state, and thereafter returns to the area outside of the information storage medium 1 and stops.

What is claimed is:

1. A glass-ceramic substrate for a magnetic information storage medium comprising a $Sio_2$—$Al_2O_3$—$Li_2O$ system glass-ceramic and having either β-quartz solid solution (β-$SiO_2$ solid solution) or a mixture of β-quartz solid solution (β-$SiO_2$ solid solution) and β-spodumene solid solution (β-$Li_2O.Al_2O_3.4SiO_2$ solid solution) as its main crystal phase, the crystal grain of the B-quartz solid solution and β-spodumene solid solution having a diameter within a range from 200 Å to 5000 Å.

2. A glass-ceramic substrate as defined in claim 1 wherein the surface roughness (Ra) after polishing of the substrate is within a range from 1 Å to 5 Å.

3. A glass-ceramic substrate as defined in claim 1 having a data zone and a landing zone, said landing zone having a multiplicity of projections or depressions formed by irradiation of laser beam.

4. A glass-ceramic substrate as defined in claim 3 wherein the laser used is a laser diode pumped solid-state laser.

5. A glass-ceramic substrate as defined in claim 3 wherein the laser used is a $CO_2$ laser.

6. A glass-ceramic substrate as defined in claim 4 wherein a wavelength of said laser diode pumped solid-state laser is within a range of 0.2 μm–0.6 μm or within a range of 1.05 μm–1.40 μm.

7. A glass-ceramic substrate as defined in claim 6 wherein percent transmission by the laser diode pumped solid-state laser of the wavelength within the range of 0.2 μm–0.6 μm or within the range of 1.05 μm–1.40 μm at a thickness of 0.635 mm is 0% to 10%.

8. A glass-ceramic substrate as defined in claim 3 wherein surface roughness (Ra) of a polished surface of the data zone is within a range from 1 Å to 5 Å, a multiplicity of projections or depressions are formed by irradiation of laser beam in the landing zone, height of the projections or depressions formed is within a range from 50 Å to 300 Å, surface roughness (Ra) of the landing zone is within a range from 10 Å to 50 Å and interval of the projections or depressions is within a range from 10 μm to 200 μm.

9. A glass-ceramic substrate as defined in claim 1 wherein the glass-ceramic is obtained by heat treating a base glass consisting in weight percent of:

| | |
|---|---|
| $SiO_2$ + $P_2O_5$ | 56–65% |
| in which $SiO_2$ | 50–60% |
| $P_2O_5$ | 6–10% |
| $Al_2O_3$ | 22–26% |
| $Li_2O$ + MgO + ZnO | 4.0–6.5% |

-continued

|  |  |
|---|---|
| in which Li$_2$O | 3–5% |
| MgO | 0.6–2% |
| ZnO | 0.5–2% |
| CaO + BaO | 0.5–5% |
| in which CaO | 0–4% |
| BaO | 0.5–3% |
| TiO$_2$ | 1–4% |
| ZrO$_2$ | 1–4% |
| As$_2$O$_3$ | 0–2% |
| Sb$_2$O$_3$ | 0–2% | wherein the weight ratio of P$_2$O$_5$ to SiO$_2$ is between 0.10 and 0.17, said glass-ceramic containing either β-quartz solid solution (β-SiO$_2$ solid solution) or a mixture of β-quartz solid solution (β-SiO$_2$ solid solution) and β-spodumene solid solution (β-Li$_2$O.Al$_2$O$_3$.4SiO$_2$ solid solution) as its main crystal phase.

10. A glass-ceramic substrate as defined in claim 1 wherein the glass-ceramic is obtained by heat treating a base glass consisting in weight percent of:

|  |  |
|---|---|
| SiO$_2$ + P$_2$O$_5$ | 56–65% |
| in which SiO$_2$ | 50–60% |
| P$_2$O$_5$ | 6–10% |
| Al$_2$O$_3$ | 22–26% |
| Li$_2$O + MgO + ZnO | 4.0–6.5% |
| in which Li$_2$O | 3–5% |
| MgO | 0.6–2% |
| ZnO | 0.5–2% |
| CaO + BaO | 0.5–5% |
| in which CaO | 0–4% |
| BaO | 0.5–3% |
| TiO$_2$ | 1–4% |
| ZrO$_2$ | 1–4% |
| As$_2$O$_3$ | 0–2% |
| Sb$_2$O$_3$ | 0–2% |
| V$_2$O$_5$ + CoO + NiO + Cr$_2$O$_3$ + CuO | 1–4% |
| V$_2$O$_5$ | 0–3% |
| CoO | 0–3% |
| NiO | 0–3% |
| Cr$_2$O$_3$ | 0–3% |
| CuO | 0–3% | wherein the weight ratio of P$_2$O$_5$ to SiO$_2$ is between 0.10 and 0.17, said glass-ceramic containing either β-quartz solid solution (β-SiO$_2$ solid solution) or a mixture of β-quartz solid solution (β-SiO$_2$ solid solution) and β-spodumene solid solution (β-Li$_2$O.Al$_2$O$_3$.4SiO$_2$ solid solution) as its main crystal phase.

11. A glass-ceramic substrate as defined in claim 1 wherein said glass-ceramic is obained by melting, forming and annealing glass-materials and subjecting the formed base glass to heat treatment for producing a crystal nucleus under a temperature within a range from 650° C. to 750° C. and for crystallization under a temperature within arange from 750° C. to 950 ° C. and has a coeffiicent of thermal expansion within a range between $-10\times10^{-7}$/° C. and $+20\times 10^{-7}$/° C. at a temperature within a range from $-60°$ C. to $+600°$ C.

12. A magnetic information storage medium having a thin film of a magnetic media formed on said glass-ceramic substrate of claim 1.

* * * * *